United States Patent [19]
Humpleman

[11] Patent Number: 5,940,387
[45] Date of Patent: Aug. 17, 1999

[54] HOME MULTIMEDIA NETWORK ARCHITECTURE

[75] Inventor: Richard Humpleman, Fremont, Calif.

[73] Assignee: Samsung Information Systems America, San Jose, Calif.

[21] Appl. No.: 08/876,618

[22] Filed: Jun. 17, 1997

Related U.S. Application Data

[63] Continuation of application No. 08/561,758, Nov. 22, 1995, abandoned.

[51] Int. Cl.$^6$ .................................................. H04L 12/44
[52] U.S. Cl. .......................... 370/352; 370/466; 370/487; 348/12; 455/6.3
[58] Field of Search ...................... 348/7, 8, 12; 455/4.2, 455/5.1, 6.1–6.3; 340/825.22; 370/352, 353, 445, 446, 486, 487, 407, 419–421, 401, 402, 463, 420

[56] References Cited

U.S. PATENT DOCUMENTS

| | | | |
|---|---|---|---|
| 4,081,792 | 3/1978 | Schüssler et al. . | |
| 4,866,787 | 9/1989 | Olesen | 348/8 |
| 4,994,909 | 2/1991 | Graves et al. . | |
| 5,347,304 | 9/1994 | Moura et al. | 455/5.1 |
| 5,387,927 | 2/1995 | Look et al. . | |
| 5,389,963 | 2/1995 | Lepley et al. | 455/4.2 |
| 5,440,554 | 8/1995 | Stannard et al. . | |
| 5,469,437 | 11/1995 | Runaldue | 370/85.3 |
| 5,488,412 | 1/1996 | Majeti et al. | 455/5.1 |
| 5,504,738 | 4/1996 | Sambamurthy et al. | 370/85.3 |
| 5,506,846 | 4/1996 | Edem et al. | 370/94.3 |
| 5,561,709 | 10/1996 | Remillard . | |
| 5,574,966 | 11/1996 | Barzegar et al. . | |
| 5,592,540 | 1/1997 | Beveridge . | |
| 5,630,204 | 5/1997 | Hylton et al. . | |

FOREIGN PATENT DOCUMENTS

| | | |
|---|---|---|
| 3146468 A1 | 6/1983 | Germany . |
| 4226589 A1 | 2/1994 | Germany . |
| WO95/19070 | 7/1995 | WIPO . |

OTHER PUBLICATIONS

Lin, Chang–Li, Yuan–Ze, and Guan, Sheng–Uei, "The Design and Architecture of a Video Library System", IEEE, Jan., 1996, pp. 86–91.

Riemann, U., "Der MPEG–2–Standard—Generische Codierung fur Bewegtbilder und zugehoriger Audio–Information", Fernseh Und Kinotechnik, vol. 48, No. 10, Oct. 1, 1994, pp. 545–550, 553.

Ramanathan et al., "Home Network Controller: A Cost–Effective Method for Providing Broadband Access to Residential Subscribers", International Conference on Consumer Electronics—Digest of Tech. Papers, Rosemont, Jun. 7–9, 1995, IEEE, pp. 378–379.

Deng, S., "Capture Effect in Residential Ethernet LAN", Globecom '95. IEEE Global Telecommunications Conference, Singapore, Nov. 14–16, 1995, vol. 3 of 3, Nov. 14, 1995, IEE, pp. 1678–1682.

Burroughs, R.S., "A Point of Entry Interface for 2–Way Broadboand Information Delivery", Proceedings from Eleven Technical Sessions of the Annual Convention and Exposition of the National Cable Television Association, San Francisco, Jun. 6–9, 1993, No. Convention 42, Jun. 6, 1993, Rutkowski K, pp. 52–61.

(List continued on next page.)

*Primary Examiner*—Chau Nguyen
*Attorney, Agent, or Firm*—Kenneth L. Sherman, Esq.; Sherman & Sherman

[57] ABSTRACT

A home network architecture has an internal digital network interconnecting devices in the home. Entertainment services are introduced into the network through network interface units that are coupled to an external network and to the internal network. The network interface units perform the necessary interfacing between the external and internal networks, and make the entertainment services available to all terminals connected to the internal network. A plurality of set-top electronics that do not have network interface units connect to the internal network and prepare the information in the digital data stream for display, by a television, for example.

10 Claims, 8 Drawing Sheets

OTHER PUBLICATIONS

Endo, K., et al., "A Home Bus System Based on Main Bus and Power Line Spread–Spectrum Bus", IEEE 1988 International Conference On Consumer Electronics, Rosemont, Jun. 8–10, 1988, No. 1988, Jun. 8, 1988, IEEE, pp. 106/107.

Quinnell, R. (editor), "Emerging 100–Mbit Ethernet Standards Ease System Bottlenecks", EDN Electrical Design News, VL. 39, No. 1, Jan. 6, 1994, pp. 35/36, 40, 42.

Olshansky, R., et al., "Residential LAN Architecture", Proceedings of the $2^{nd}$ International Workshop on Community Networking Integrated Multimedia Services in the Home, Jun. 20–22, 1995, New York (US), pp. 55–60.

Singh, R.P., et al., "Jitter and Clock Recovery for Periodic Traffic in Broadband Packet Networks", IEEE Transactions on Communications, vol. 42, No. 5, May 1, 1994, pp. 2189–2196.

Droitcourt, J.L., "Understanding How Interactive Television Set Top Box Works . . . And What it Will Mean to the Customer", International Broadcasting Convention, Vol. 413, Sep. 14, 1995.

Lau, Richard C., Synchronous Techniques for Timing Recovery in BISDN, IEEE, Feb./Apr., 1995, pp. 1810–1819.

HOME MULTIMEDIA NETWORK ARCHITECTURE

This application is a continuation of application Ser. No. 08/561,758 filed Nov. 22, 1995 abandoned.

RELATED APPLICATIONS

This patent application is related to U.S. application Ser. No. 08/561,757, filed on Nov. 22, 1995, entitled SET-TOP ELECTRONICS AND NETWORK INTERFACE UNIT ARRANGEMENT; U.S. application Ser. No. 08/561,535, filed on Nov. 22, 1995, entitled METHOD AND APPARATUS FOR RECOVERING DATA STREAM CLOCK; U.S. application Ser. No. 08/561,534, filed on Nov. 22, 1995, U.S. Pat. No. 5,579,308, entitled CROSSBAR/HUB ARRANGEMENT MULTIMEDIA NETWORK.

1. Field of the Invention

The present invention relates to digital networks, and more particularly, to digital networks for home use which provide interconnectivity of products within the home and to external networks outside the home.

2. Background of the Invention

The rapid gains in digital technology and telecommunications have increased the desirability of having a network in the home to interconnect a multitude of products in the home with each other and to the outside world. The range of available outside services includes interactive services, cable video and audio services, satellite networks, telephone company services, video on demand, and other types of information services. However, penetration of the personal computer into homes in the United States is approximately 33% and only growing slowly, although governments desire more extensive penetration to encourage "telecommuting" and reduce road traffic and pollution. Further penetration of computers in the home will originate from the purchase of consumer entertainment and informational products containing an embedded computer and operating system hidden by an opaque user interface. Such a product is a conventional set-top box.

Set-top boxes are multi-media computers that augment the use of televisions. A conventional set-top box has an external network interface module that connects the set-top box to the external network and data provider. The network interface module has to perform a number of sophisticated functions, such as interfacing to a specific external network, tuning, demodulation, error correcting, video descrambling, recovery of MPEG clock, and encryption and decryption specific to the external network. Consequently, the network interface module is a relatively expensive component of set-top boxes. This expense would be necessary when even a single television is present in the house. However, most homes contain multiple televisions, and providing each with its own set-top box and associated network interface module is a duplication of expensive components.

Another concern for homeowners is the issue of the service providers. Limitation to one service provider for all services introduced into the home through a set-top box, such as by a telephone provider, restricts the choices of a homeowner and possibly prevents the homeowner from obtaining services at the lowest competitive price. Attempting to overcome this problem with multiple service providers using a stack of multiple set-top boxes on every television in a home is not a viable solution.

SUMMARY OF THE INVENTION

There is a need for a home network that provides interconnectivity to products in a home and to external networks in a relatively inexpensive manner and which also provides the homeowner with the opportunity to select from a variety of different services.

These and other needs are met by the present invention which provides a home network that has multiple set-top boxes and separate network interface units coupled together by a relatively inexpensive digital network installed in the home, such as Ethernet.

The separation of the network interface unit functions from the set-top electronics allows a single network interface unit to be used to interface with an external network and to provide programming selectively to a multitude of set-top electronics and televisions within the home. This reduces the need for duplication of the network interface functions at each television or other end product and thereby reduces the costs of the home network. Further, having separate network interface units on the network allows the consumer to pick and choose among available services, and not to be constrained to a single service provider. Changing a service may be performed simply by exchanging or adding a different network interface unit configured to interface with the new external network.

The use of Ethernet in certain preferred embodiments also makes the network relatively low cost, as twisted pair wiring may be installed at low cost in a home.

The foregoing and other features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
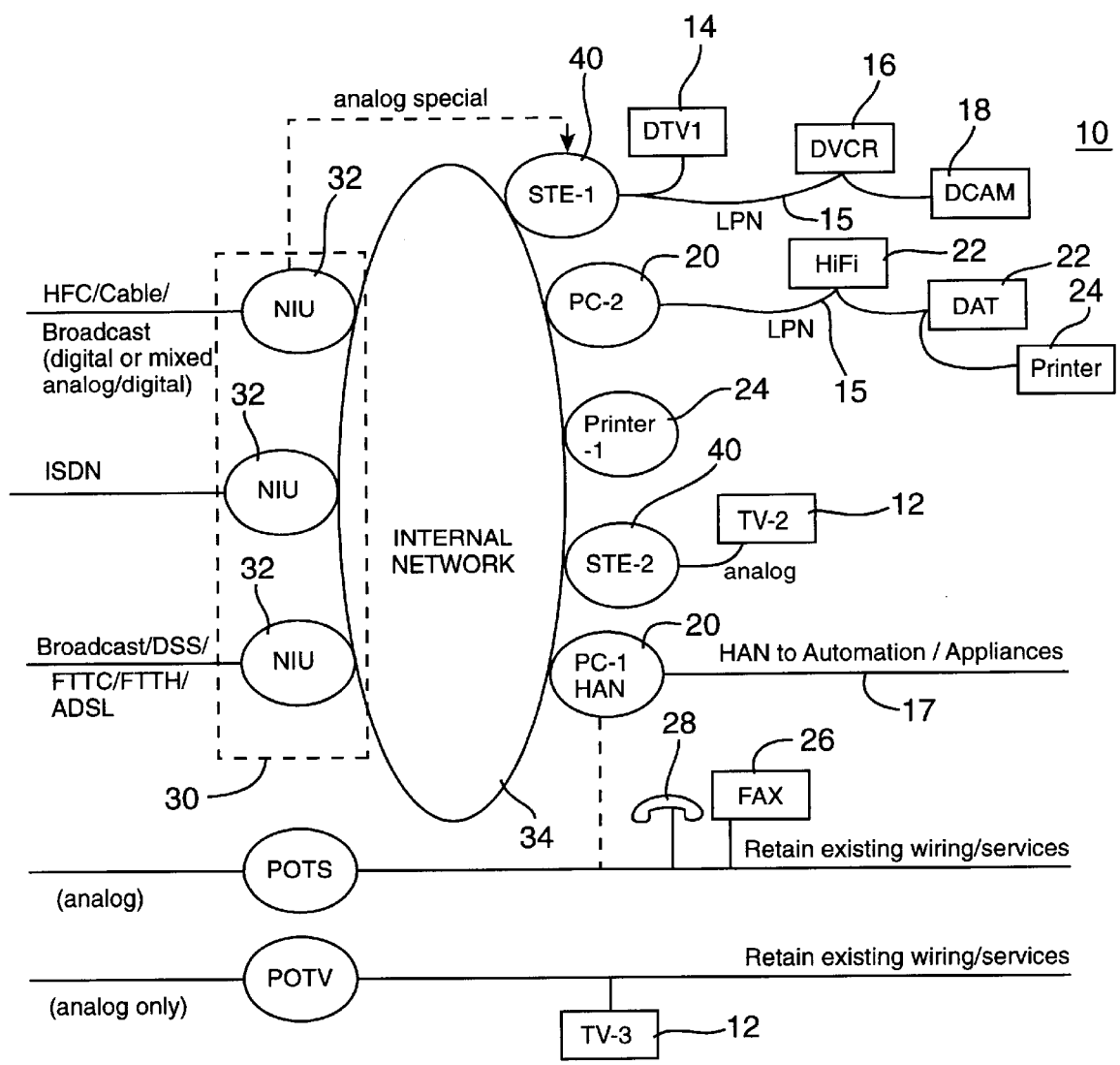
FIG. 1 is a schematic block diagram of a home network constructed in accordance with an exemplary embodiment of the present invention.

FIG. 1 is a schematic depiction of a home multimedia network 10 constructed in accordance with an embodiment of the present invention. This embodiment is exemplary only, however, as the network 10 may be configured in any of a number of different ways within the scope of the invention, and may include different devices coupled to the network 10. Additionally, the invention is not limited to networks located in homes, but is applicable to networks installed in other types of structures, such as offices, apartment buildings, etc. For purposes of illustration, however, the exemplary embodiment will be described in the context of a home installation.

The network 10 is a digital network that provides connectivity of different types of equipment to the world outside the home. This equipment can be, for example, analog television 12, digital television 14, digital VCR 16, digital camcorder 18, personal computers 20, audio equipment 22, printers 24, facsimile machines 26, and telephones 28, among others. In addition to connecting this equipment to the outside world, the network 10 also connects the digital video, digital audio, computer and telephone equipment together internally in the home. This unifies communication and control within the home, making the full power of the external network connections or internal data sources available to any terminal on the network 10.

Communication with the outside world is performed through a number of separate network interface units (NIU's) 32 and may be combined physically in an entrance unit 30, with each network interface unit 32 permitting a connection between a different external network and the home network 10. The different external networks may carry different types of signals. These may be, for example, broadcast signals (digital or mixed analog/digital) carried on hybrid fiber coax or cable. Other types of signals are ISDN, broadcast/digital satellite service, FTTC, FTTH, ADSL, and others. At least the following data types may be carried: compressed video, compressed audio, compressed internet WWW graphics and data, internet e-mail and other data, computer file data and control message data.

Logically all terminals in the home network 10 receive equal access to the network interface units 32 and a user would be unaware of the physical sitting of them. The number of network interface units 32 that are required is determined by the number of streams required per home, e.g. the number of different program channels (i.e., video, audio, and other) required simultaneously, not by the number of terminal units in a home.

In certain preferred embodiments, cable or antenna television is retained unmodified with distribution by regular in-home coax (plain old television, or POTV). POTS (plain old telephone service) is also carried on the in-home digital network 10.

The digital signals are distributed throughout the home over an internal network 34. In certain preferred embodiments, the internal network 34 is essentially Ethernet of type 10 base-T or 100 base-T twisted pair but a special switch hub is employed to make the network scalable to any number of terminal units each able to receive high bit-rate video.

The home network 10 connects those computers, or products with embedded computers, that can support the networking bandwidth, protocols, routing, buffering and addressing. Other high bandwidth products that do not support this complex functionality must attach to such a host unit either directly or via a local peripheral network to achieve interoperability. Examples of computers or products with embedded computers located on the home network 10, functioning as end user devices, include: the network interface units I/O computers performing external network to home network conversion and conditioning; computers, such as the set-top electronics (STE); PC's; workstations; high end printers; and special computers providing gateway/control functions. Other end user devices that can be coupled to the network 10 include video products: digital compressed (MPEG) and uncompressed video equipment; digital video camcorder products; digital video tape recording products and digital tv display products and analog tv display and recording products. Audio products that can be coupled to the network 10 include: digital compressed (MPEG) and uncompressed audio equipment; HIFI stereo; digital audio tape recording products. Other types of products that can connect to the network 10 are data products, such as printers and other peripherals. Still further products that can be controlled through the network 10 include home automation and appliances: central heating/AC, security controller, microwave oven and other kitchen equipment, lighting, sprinkler and other power control.

Certain embodiments of the home network 10 include one or more local peripheral networks 15 that provide local connection for future very high bit rate, motion-JPEG or I-frame-only-MPEG video devices, audio devices, printers and such peripherals. These devices need continuous local digital connection at a high bandwidth, where the data transfer is continuous from, for example, digital camera to digital VCR. Accommodating such devices directly on the internal network 34 would require greater network bandwidth over the entire network 34 than normally needed. Instead, the local peripheral network 15 is normally connected by gateway to the internal network 34 for interoperability. However, in certain other embodiments of the invention, the home network 10 is provided with hardware and software that accommodates the high speed devices so that a local peripheral network 15 is not necessary.

A home automation network 17 is provided for home automation. This home automation network 17 may run on the power line or other low bit rate network for controlling appliances, home security systems, lighting, etc. This spur originates from a control computer 20 located within the home.

Figure 2:
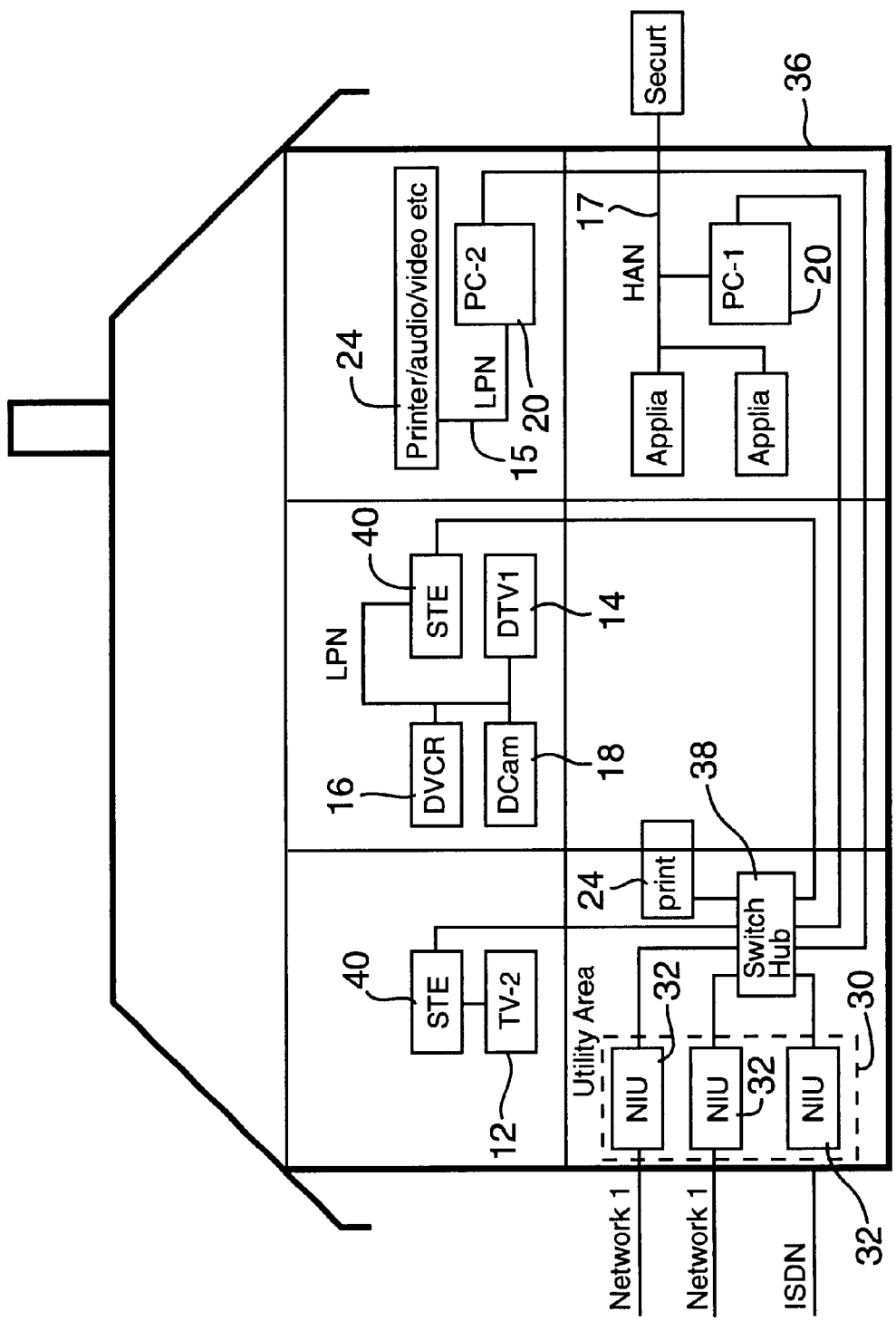
FIG. 2 is a depiction of an exemplary installation of the home network of the present invention within a home.

An exemplary model of the installation of the home network 10 of the present invention within a house 36 is depicted in FIG. 2. The home network 10 is a long range backbone capable of up to 100 m cable runs, for example, from a switched hub 38 that forms part of the internal network 34. In the exemplary installation depicted in FIG. 2, the entrance unit 30 with its multiple network interface units 32 are located in a utility area of the house, along with the switched hub 38.

Twisted pair cable is run to each room of the house 36 and terminates at a wall socket. Cat-5 twisted pair (for 100 Mbits/s), for example, may be used when doing an installation, as the majority of the cost is labor. For temporary retro-installation, twisted pair cable is small enough that it may be customer fitted under a carpet edge. A user in the home will connect a computer product in a room by plugging the Ethernet port of the computer product to the Ethernet wall socket.

In the embodiment of FIG. 2, the hub 38 is depicted as a separate device, but in other embodiments the hub 38 is integrated into one or more of the network interface units 32. The hub 38 provides the connectivity to all areas of the house and the one or more network interface units 32. Upgrading, expanding both the aggregate bandwidth and connectivity of the internal network 34, is accomplished by additional plugging or changing to a larger hub. The hub will be discussed in more detail later.

The present invention, as shown in FIGS. 1 and 2, separates the functionality of the network interface units 32 from the set-top electronics 40. Conventionally, a set-top box contains a network interface unit whose components are internally connected by a bus to the set-top electronics components. By contrast, however, the present invention provides a separation of the network interface units 32 and the set-top electronics 40, with the internal network 34 interposed therebetween. This arrangement permits multiple set-top electronics to be distributed throughout the home 36 less expensively, since the electronics of a network interface unit do not have to be duplicated for each set-top electronics. Additionally, having separate network interface units 32 coupled to different external networks and to a common internal network 34 frees the homeowner from being forced to receive all programming from a single source, such as the telephone or cable company. The separation also allows the homeowner to add, drop or change services simply by changing one of the network interface units 32, without the need for replacing all of the set-top electronics 40 throughout the home 36.

In certain embodiments, a "master" set-top box is provided with multiple network interface units. However, this embodiment is logically the same as described above, as the network interface units are connected in this embodiment to the internal network, and not by a bus to the set-top electronics.

Figure 3:
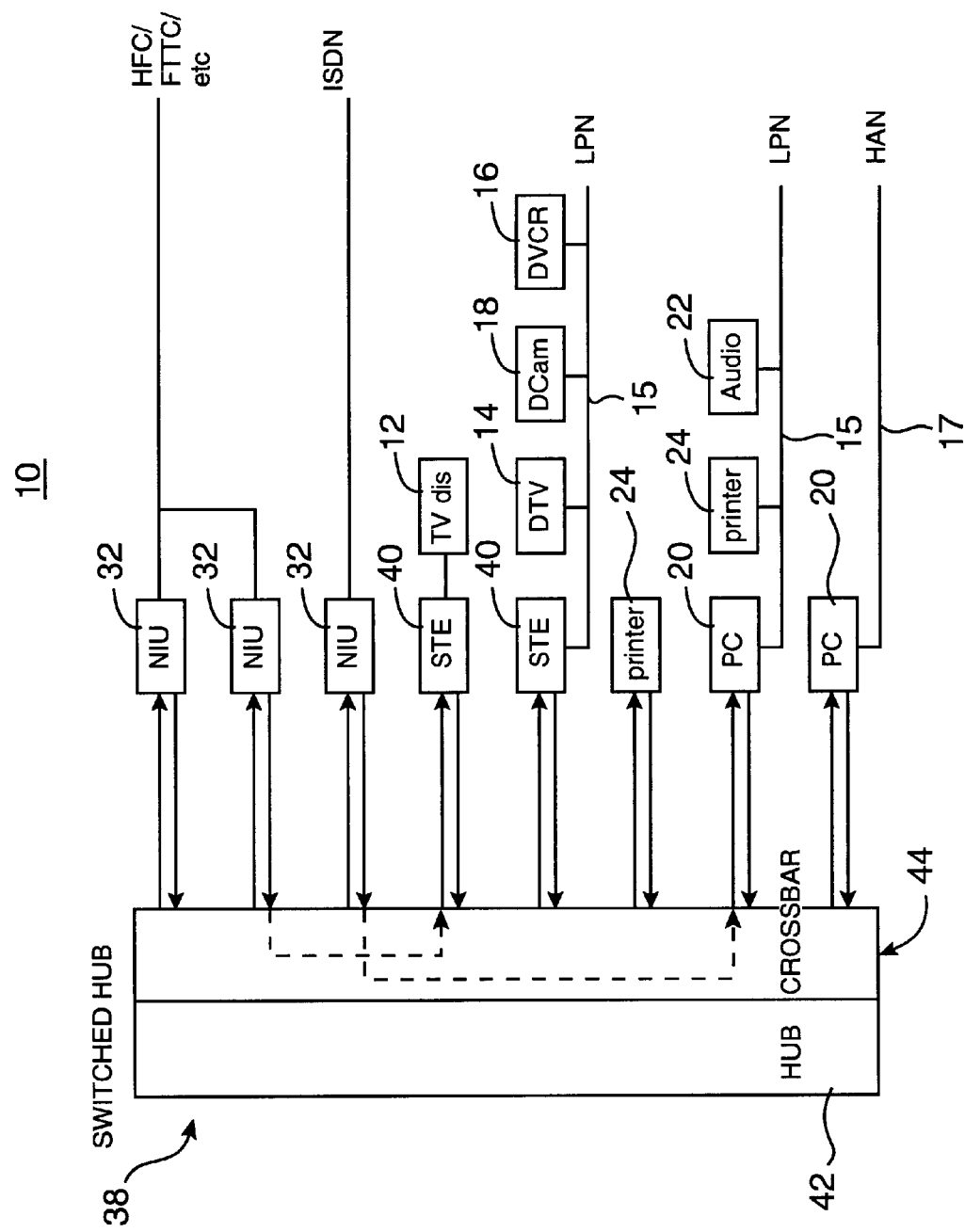
FIG. 3 is a logical diagram of the home network of FIG. 1.

FIG. 3 is a logical view of the home network 10 of the present invention. As apparent from the diagram, the multi-port switched hub 38 forms the center of the network connections. In certain embodiments, in which inter-packet jitter is adequately controlled, a traditional, commercially available packet switched hub is employed. In other preferred embodiments, such as that depicted in FIG. 3, the switched hub 38 is a combination of networked ports and ports that are direct (circuit) switched for the duration of a session. The direct connected ports (and systems) can be phase locked via the network (coded) clock. To provide this functionality, the switched hub 38 therefore comprises a relatively simple and inexpensive hub 42 and a direct circuit crossbar 44. The hub 42, in certain preferred embodiments, may be a commercially available device, such as Am79C981 manufactured by Advanced Micro Devices, of Sunnyvale, Calif. Details of the direct circuit crossbar 44 will be described later with respect to FIG. 7.

A star topology as defined by Ethernet 10/100 base-T is used in conjunction with the switching hub 38. The switching hub 38 provides fan out to most rooms in the house 36. The maximum system bandwidth is a multiple of the wire bit rate ((bit rate×number of ports)/2), for example, 20 ports and 100 Mbits/s bit rate=1 Gb/s aggregate maximum bandwidth.

The switched hub 38 enables special treatment for the heavily asymmetric traffic, e.g., compressed digital video and internet data by directly routing these cases from transmitter to receiver. This traffic is thus separated from the internal network 34 and allows an overall aggregate bandwidth to be limited only by the expandability of the hub 38, although it will remain limited by the 10 Mbits/s per branch. Use of 100 base-T technology instead of 10 base-T technology will uprate the network if required.

The switching hub's direct synchronous (Manchester or block encoded) connections are used primarily for the transmission of MPEG video where a continuous, high bit rate, long duration connection is required. High bit rate video in compressed form can be as high as 8 Mbits/sec and is needed for live video and high action movies and sports. Low bit-rate video is 1.5 Mbits/sec. According to the present invention, MPEG digital video is retained throughout the network 10. Conversion to real video takes place only at the display device (e.g., television 12) or the set-top electronics 40.

Two separate direct circuits are depicted as examples in FIG. 3. For example, the network interface unit 32 that is coupled to an ISDN network is directly connected through the direct circuit crossbar 44 to the personal computer 20 of the local peripheral network 15. Another, separate direct circuit is provided by the direct circuit crossbar 44 between a different network interface unit 32 (coupled to hybrid fiber coax, for example) and the set-top electronics 40 coupled to the television 12. Those devices that are not directly connected through the direct circuit crossbar 44 remain attached to the hub 42 and are thus networked.

With respect to the switching hub architecture, where a direct point-to-point path is configured, all data traversing this path is provided directly to the end point terminal of the path, even data intended for one or more other terminals. Thus, in certain preferred embodiments, a rule is followed that data multiplexed with the high rate data (typically messaging) must be issued to networked terminals by the end point of the direct path returning such packets to the hub 38. For example, messages sent over the ISDN network that are not intended for a device on the local peripheral network 15 will be returned by the local peripheral network host 20 to the hub 38 for distribution. This rule saves the expense and complication of having a packet router type switched hub, with the demultiplexing distributed at the end point(s) rather than centrally, and works well for asymmetric data flow and local destination, i.e., not subject to layers of switches.

An advantage of directly switched paths is that potential delays in obtaining access to the network 34 (and possibly upsetting the delicate clock reference timing carried in the MPEG stream) are avoided altogether.

The hub 38, in certain preferred embodiments, is required to be "full-duplex aware" meaning that a directly routed path connects only a transmitter terminal "up" path only to a receive terminal "down" path. By contrast, the path down to the transmitter and path up to the receiver are not affected by the direct circuit and would normally be attached to the network, i.e., attached to all the remaining terminal paths connected together.

Specific routing occurs in response to user service requests. Messages are picked up by the hub control and any direct routing changes implemented. Devices not switched from the network remain connected and no routing is required.

The MPEG clock recovery is performed at the network interface units 32, as described later. With the MPEG clock recovery at the network interface units 32, and the establishment of a direct circuit to the home network destination, jitter in the signal received at the destination (such as the television 12) is substantially eliminated. Direct circuit capability works well for the heavily asymmetric point to point traffic expected in the entertainment (video) home scenario.

For analog only services, e.g., transitional cable TV, this is not considered part of the digital network. For mixed digital/analog services such as hybrid fiber coax (HFC) and newer forms of mixed cable TV, this is considered a transitional state and dealt with as a temporary add-on to the all digital system of the present invention. The signal from the hybrid fiber coax is provided directly to a set-top electronics 40 or to a network interface unit 32/set-top electronics 40 combination. Two ports are required to connect to the home network 10, one for the network interface unit 32 and one for the set-top electronics 40. A bypass is provided in certain preferred embodiments to link the analog signals across to the audio/video circuits of the set-top electronics 40.

Figure 8:
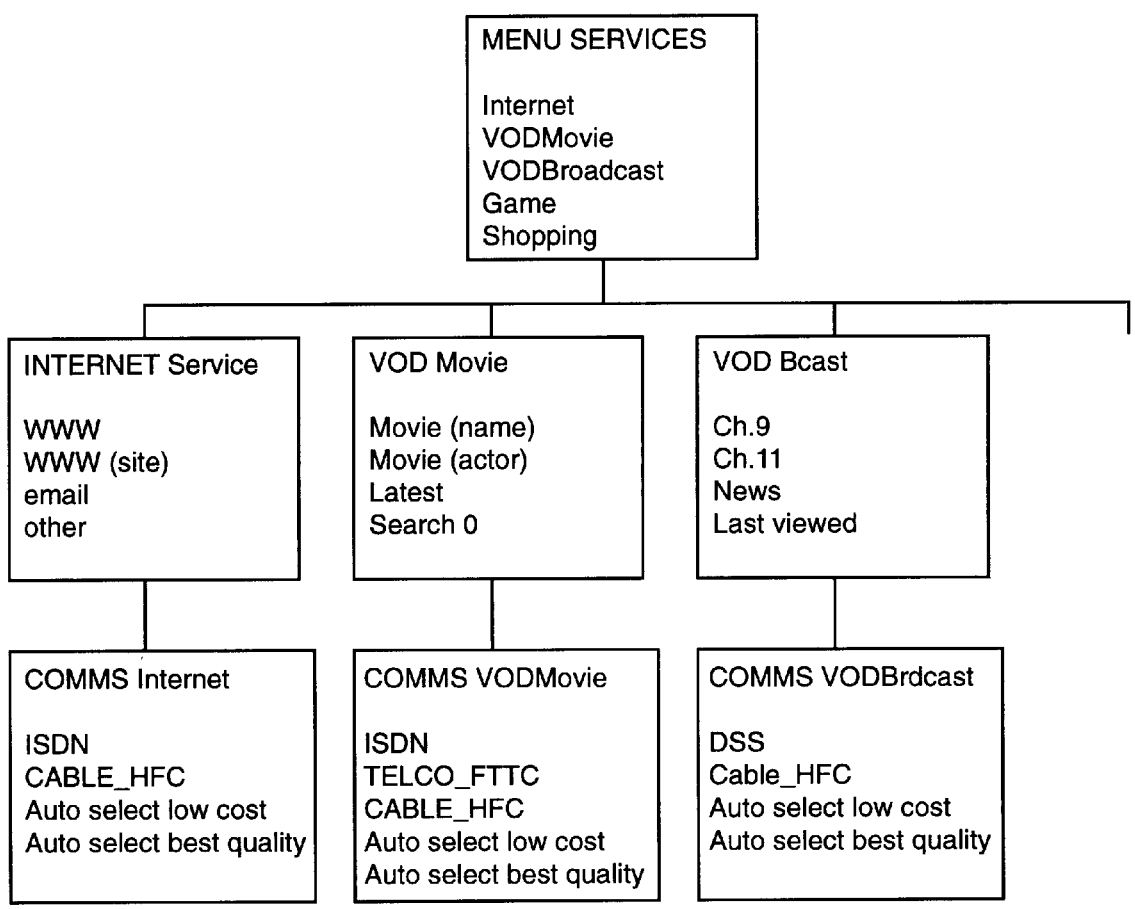
FIG. 8 is a logical diagram of an exemplary user interface for the home network of the present invention.

The home network 10 is controlled via hand held commander or computer keyboard to software running at the local terminals, such as the personal computers 20, or set-top electronics 40. Control software local to each home terminal manages source availability, source selection, path management by communication with the network interface units 32 and external gateways. The external network protocols are buffered in the network interface units 32 to provide a standard interface to the terminals on the home network 10. FIG. 8 depicts one an example of a user interface. In this embodiment, the home network 10 is transparent and the user is only aware of it indirectly from the number of connected services.

Figure 4:
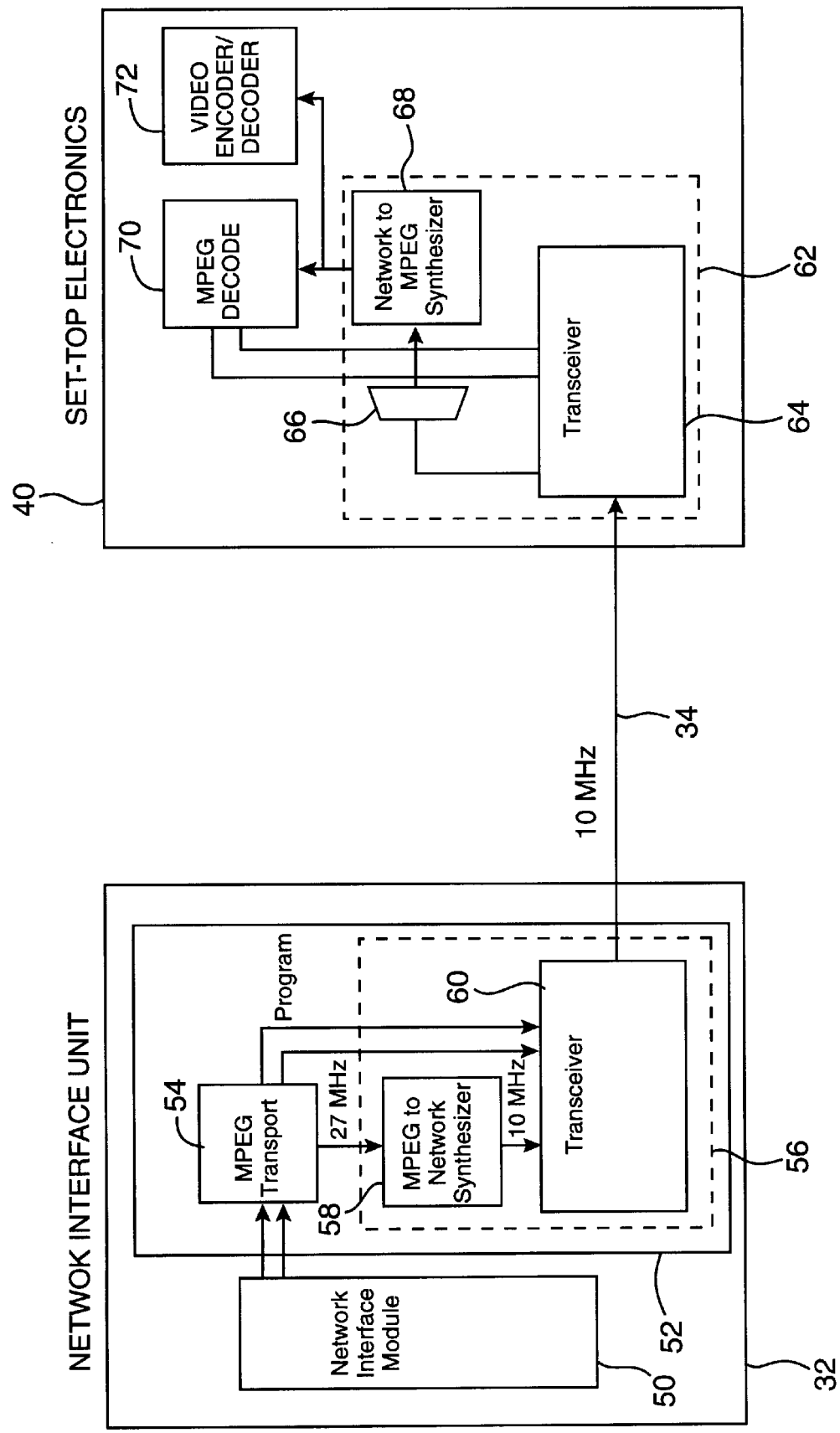
FIG. 4 is a schematic depiction of a network interface unit and a set-top electronics unit constructed in accordance with preferred embodiments of the present invention.

FIG. 4 is a block diagram depicting a single network interface unit 32 coupled by the internal network 34 to a single set-top electronics unit 40. The remaining portions of the home network 10, including the switching hub 38, are not shown in FIG. 4 for purposes of illustration and explanation.

The network interface unit 32 has one or more network interface modules 50 that interface the network interface unit 32 to a particular external network. In the example of FIG. 4, the network interface module 50 provides an interface to an external network that carries MPEG video data. The MPEG video data is provided to an internal network interface device 52 that prepares the data for transport over the internal network 34. In certain preferred embodiments, the internal network 34 is an Ethernet network, so that the internal network interface device 52 is an Ethernet interface device.

The architecture of the present invention assumes that for some networks a first stage demultiplexing at the network interface unit 32 is necessary to stay within a definable bandwidth limit (one stream) rather than an arbitrary bandwidth set by the construction of the incoming stream (multiple streams). Making the assumption that MPEG-2 video is being used, there is a demultiplexing from a multiple program transport stream into a single program transport, as defined in the MPEG-2 specification. This is performed by an MPEG transport chip 54, such as the 9110B chip commercially available from C-Cube. (A second stage demultiplexing to separate the video, audio and other data still occurs in the set-top electronics, while decoding is preferably only performed at the display terminal or computer.) With this approach, it is not necessary to send high bandwidth streams throughout the house and the terminals in the home 36 need see only a standardized single program interface. Compression is required for video generated in the home, e.g. security front door camera or video conference camera.

All the external network interfacing, decryption, access control, demultiplexing to a single program stream, etc., is performed by the network interface module 50. Thus, the network interface module 50 buffers the home network hardware and software from the peculiarities of the attached external network. Multiple different programs require multiple network interface crossbar connections whether from one or multiple providers. In certain embodiments, a dual module is provided with two connections to the crossbar, providing two programs received from the same external network.

The MPEG transport chip 54 performs the MPEG clock recovery and provides the recovered 27 MHz clock and the selected program to an internal network connection 56. The 27 MHz clock is received by an MPEG to network synthesizer 58 and converted to a 10 MHz clock, for example, when the internal network 34 is a 10 base-T Ethernet network. The 10 MHz clock, as well as the selected program, are provided to a conventional transceiver 60 (such as an Ethernet transceiver) connected to the internal network 34. The synthesizer 58 acts to lock the Ethernet clock to the recovered MPEG clock. When the packet of data is transmitted from the network interface unit 32 to the set-top electronics 40, the set-top electronics 40 is locked to the recovered MPEG data at 27 MHz. At the set-top electronics 40, the 27 MHz clock is regenerated from the Ethernet 10 MHz clock by another synthesizer.

The data is received in the set-top electronics 40 by a network interface device 62 that includes a network interface 64. The 10 MHz clock recovered by the network interface 64 from the data stream off the network 34 is gated through gate 66 to a network to MPEG synthesizer 68. Gating is needed so that the locking function is performed only when there is a packet of data present. The 10 MHz clock is converted to a 27 MHz clock provided to an MPEG decoder 70 and a video decoder/encoder 72. The selected program is provided by the network interface 64 to the MPEG decoder 70, which decodes the MPEG data and provides it to the video decoder/encoder 72. The data stream is converted by the video encoder 72 to a format (e.g., NTSC or SVideo) suitable for use by a display device, such as a television. The video decoder is for the case (HFC) where there may be an NTSC analog signal to digitize and merge with on-board graphics hardware.

The network 34 in FIG. 4 is depicted schematically, and it should be understood from the previous description that the video data may be placed on the network 34 through the hub 42, but that a direct circuit of the network interface unit 32 and the set-top electronics 40 through the direct circuit crossbar 44 of the network 34 is preferred to provide a jitter free transfer of video data.

Figure 5:
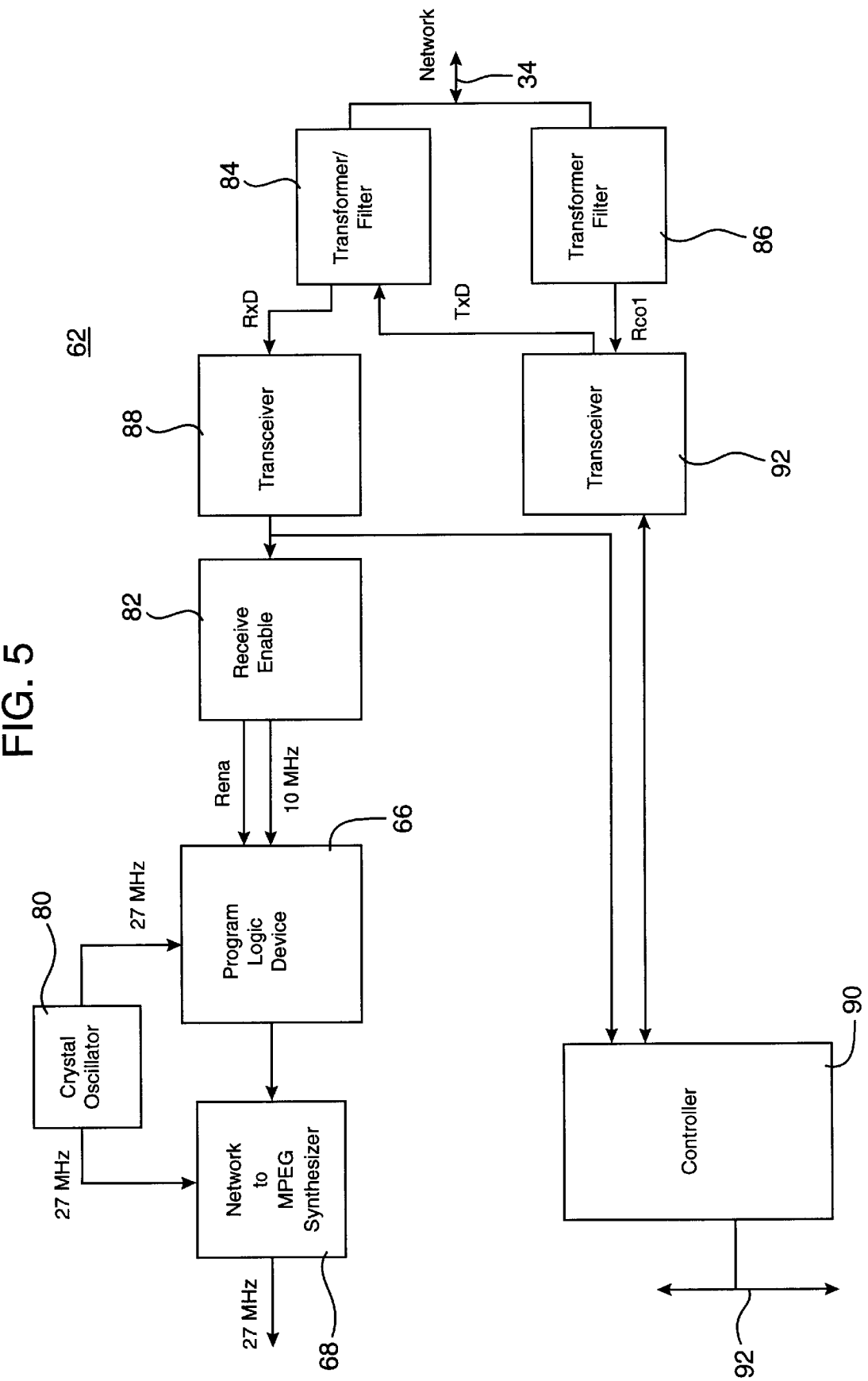
FIG. 5 is a block diagram of a network interface of the set-top electronics constructed in accordance with an exemplary embodiment of the present invention.

FIG. 5 is a more detailed diagram of an exemplary embodiment of the network interface device 62 of the set-top electronics 40 depicted in FIG. 4. The network interface device 62 includes the network synthesizer 68 coupled to a program logic device operating as the gating device 66. The network synthesizer 68 may be implemented by a commercially available chip, such as the MC145151 manufactured by Motorola. The program logic device 66 may be implemented by a commercially available chip, such as the MC7958, also manufactured by Motorola. A voltage controlled crystal oscillator 80 operates at 27 MHz and provides its signal to the program logic device 66, which gates the 10 MHz signal to the synthesizer 68 when there is a received data packet. The synthesizer divides down the 10 MHz and 27 MHz frequencies to a common frequency which is fed into a phase detector of the synthesizer 68. The output of the phase detector of the synthesizer 68 is provided as a control signal to the voltage controlled crystal oscillator 80 to adjust the local frequency up or down to lock to the incoming Ethernet frequency.

The signal informing the program logic device 66 of the receipt of a data packet, and the 10 MHz clock, are provided by a serial interface adapter 82 serving as a receive enable. A commercially available product suitable for the serial interface adapter is Am7992B, manufactured by Advanced Micro Devices.

The data stream is received through a transformer/filter 84, such as one commercially available from Pulse Engineering, the PE68026. Collision information is also received through another transformer/filter 86, which can be the same type of transformer/filter as 84. The received data is provided to a first network transceiver 88, such as a twisted pair Ethernet transceiver plus (Am79C100). The output of the first network transceiver 88 (the received data) is made available to the receive enable 82 and a controller 90. The controller 90 may be a commercially available product, such as the single-chip Ethernet controller Am79C970 (manufactured by Advanced Micro Devices). The controller 90 is coupled to a bus 94, such as a peripheral component interconnect (PCI) bus, for providing the received data from the network 34 to the MPEG decoder 70 of the set-top electronics 40.

A second network transceiver 92 is coupled to the controller 90, and may be implemented by the same type of transceiver as 88. The second network transceiver 92 provides the transmit path for data from the controller 90 to the network 34 through the transformer/filter 84.

Collision information is routed through transformer/filter 86 and the second transceiver 92 to the controller 90.

Figure 6:
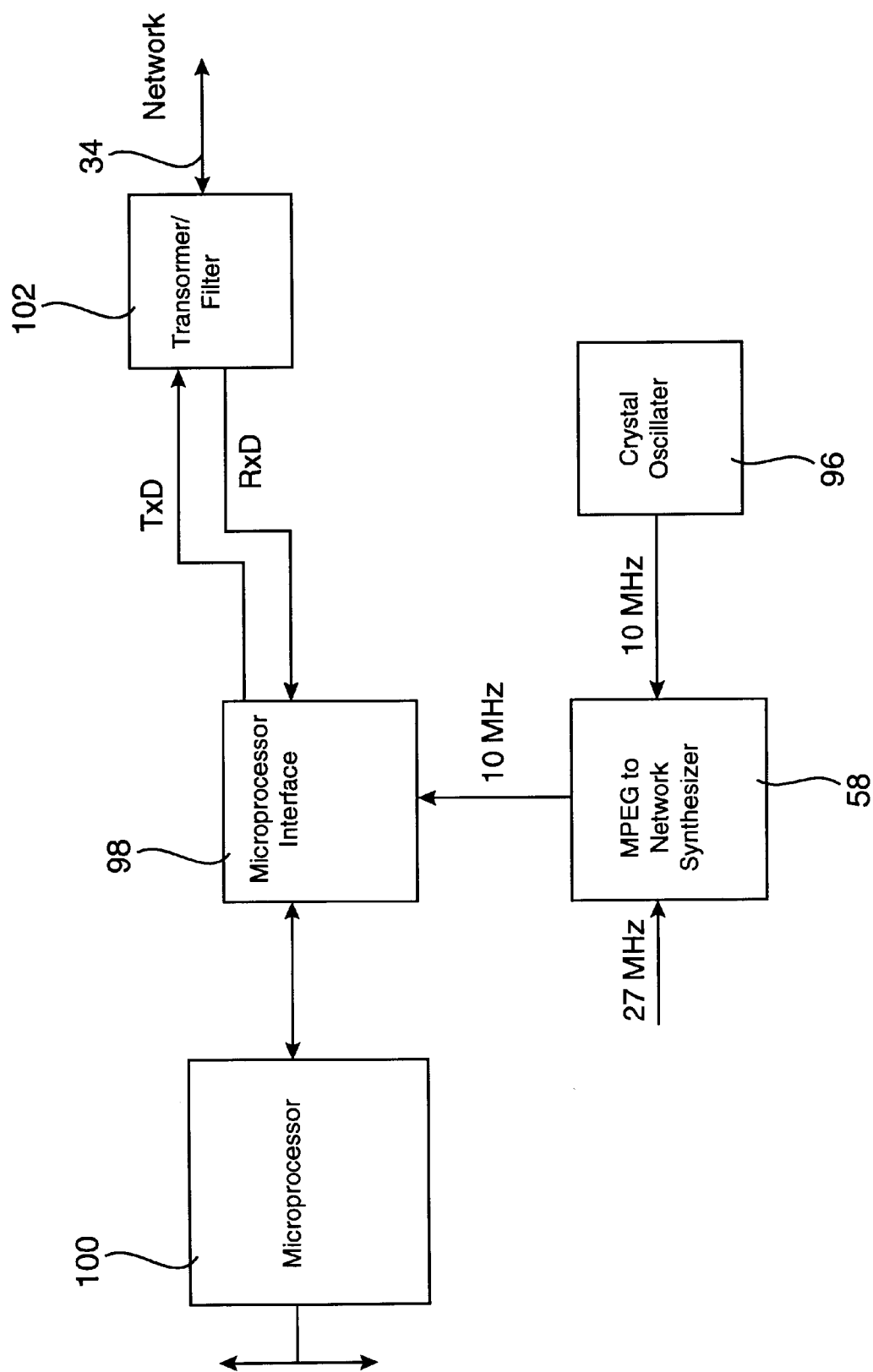
FIG. 6 is a block diagram of the network interface of the network interface unit constructed in accordance with an embodiment of the present invention.

FIG. 6 is a more detailed diagram of the internal network connection 56, which has an MPEG to network synthesizer 58 that synthesizes the 10 MHz clock from the 27 MHz MPEG clock recovered by the MPEG transport chip 54 (see FIG. 4). A crystal oscillator 96 is coupled to the synthesizer 58 to provide a 10 MHz signal. In certain embodiments, the crystal oscillator 96 is a 20 MHz oscillator, and the frequency generated by the synthesizer is 20 MHz, which is then simply divided to 10 MHz at the receiver (the set-top electronics 40). A commercially available synthesizer is the MC145145-2, manufactured by Motorola.

The 10 MHz clock is provided to a microprocessor interface 98, which serves as interface for a microprocessor 100. The microprocessor interface 98, with the microprocessor 100, form the transceiver 60 that connects to the internal network 34 through a transformer/filter 102. The microprocessor interface 98 may be, for example, a MC68160 chip manufactured by Motorola, and the microprocessor may be a MC68EN360, also manufactured by Motorola. The transformer/filter 102 may be the same type as transformer/filters 84, 86 of FIG. 5.

The separation of the network interface unit 32 from the set-top electronics 40 provides a number of advantages, as described earlier. The functions (responsibilities) of the conventional set-top boxes with integrated network interface units are divided in embodiments of the present invention. For example, in preferred embodiments, the network interface unit 32 is responsible for performing external network specific interfacing, tuning demodulation, and error correction. It provides external network specific video descrambling and encryption/decryption (credit card number, user password, etc.). The network interface unit 32 also provides an external network specific program guide. Additionally, it performs MPEG transport demultiplexing to a single stream and MPEG reference clock recovery. In preferred embodiments of the invention, the network interface unit provides home network Ethernet interfacing and MPEG/Ethernet clock locking. It also provides the software to support the external network and home network protocols for multiple streams and multiple users. The network interface unit also has the software to act as the gateway for the home network and control the buffering of data as necessary.

The set-top electronics 40 essentially acts as an application computer with audio, video, graphic and analog television interface, in preferred embodiments. For example the set-top electronics provides the home network specific interfacing and data buffering as necessary. It provides Ethernet clock/MPEG clock locking in preferred embodiments. The set-top electronics 40 decodes MPEG video and audio to recover digital audio/video. It performs digital to analog conversion for audio and video, and supports commands from an infrared remote control. The set-top electronics 40 provides support for analog video input (NTSC). It interfaces printers, game ports, etc., and supports boot level operating system and is able to down load a full system from an external network. The set-top electronics 40 supports application programs and communications through the network interface units to a network provider and program video server.

Figure 7:
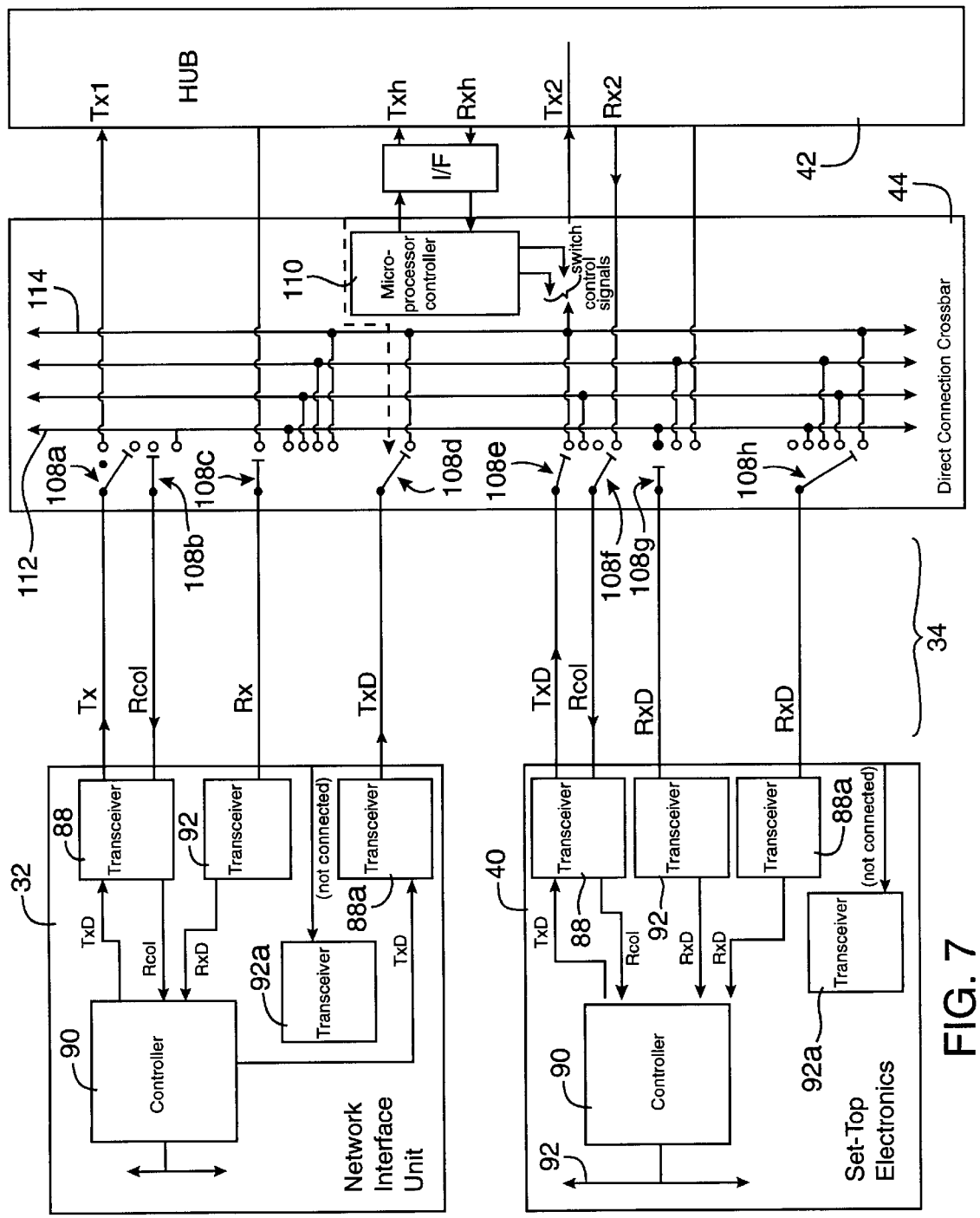
FIG. 7 is a block diagram of a hub and direct circuit crossbar, constructed in accordance with an embodiment of the present invention, coupled to a network interface unit and a set-top electronics unit.

FIG. 7 is a block diagram depicting in more detail an exemplary embodiment of the hub 42 and direct circuit crossbar 44 arrangement of the present invention and its connection with a network interface unit 32 and set-top electronics 40. The direct circuit crossbar 44 and 42 selectively provide either a direct circuit between a particular network interface unit 32 and a set-top electronics 40, or a simple network connection through the hub 42 for these units. In FIG. 7, only portions of the network interface unit 32 and the set-top electronics 40 are depicted, for purposes of illustration and explanation.

In preferred embodiments of the present invention, the hub 42 is a relatively simple and inexpensive hub, since it does not include any sort of packet routing switch or store and forward switch. There is no intelligence that examines the traffic and dynamically switches the hub according to the transmit and receive addresses as in hubs that have packet routing switches.

Although only one network interface unit 32 and one set-top electronics 40 are shown directly connected in FIG. 7, any number of directly connected pairs may be connected by the direct circuit crossbar 44, depending on the size of the crossbar 44. The network interface unit 32 and the set-top electronics 40 are each shown with five pin positions or connections, each of the connections being a pair. This coincides with a conventional telephone plug, the telephone RJ45, which has ten pin positions.

The internal network 34 provides the connection between the network interface units 32, the set-top electronics 40 and the direct circuit crossbar 44. In preferred embodiments, the internal network 34 is 10 or 100 base-T Ethernet.

The selection of a network connection or a direct circuit between the network interface unit 32 and the set-top electronics 40 is established by a number of switches 108, which are depicted in FIG. 7 with letter suffixes to distinguish them from each other in the following description. In the example of FIG. 7, the network interface unit 32 and the set-top electronics 40 are to be directly connected with one another, with the network interface unit 32 transmitting data to the set-top electronics 40. A microprocessor 110 serves as the controller for the direct circuit crossbar 44 and controls the positions of the switches 108 in response to user commands that require a direct circuit to perform. For example, a user may choose to watch a movie from a video on demand service and therefore makes this selection on a hand-held remote control. The microprocessor 110, in response to this selection, will then change the positions of the switches 108 to establish a direct circuit between the network interface unit 32 that is connected to the external network that carries the video on demand service, and the set-top electronics 40 that is coupled to the television receiver on which the user desires to view the movie.

In this case, switch 108a is moved to its illustrated position to connect the transmit lines of transceiver 88 of the network interface unit 32 to line 112 of the direct circuit crossbar 44. The transmit lines of transceiver 88 are no longer connected to the network at the Tx1 port of the hub 42. Similarly, the receive lines of the transceiver 92 of the set-top electronics 40 are connected through switch 108g to the same line 112 of the direct circuit crossbar 44. With this direct circuit now established, data entering the home through the network interface unit 32 is not broadcast over the network via the hub 42, but instead is provided directly to the set-top electronics 40 at the location where the data will be used.

Although the direct circuit established by the direct circuit crossbar 44 provides an excellent pathway for data from the network interface unit 32 to the set-top electronics 40, it may occur that not all of the data coming into the network interface unit 32 is meant for the set-top electronics 40. For example, it is possible that e-mail is received over this particular network interface unit 32, and the homeowner wants e-mail to be directed to a personal computer, and not to a television. However, there is no connection to the network 34 due to the direct circuit once a direct circuit is established.

To solve this problem, the set-top electronics 40 examines the addresses of the data packets it receives and performs a routing function for data that is not meant for this set-top electronics 40. The data is re-routed by the set-top electronics 40 onto the network 34 through the hub 42. This re-routing by the end point connection (the set-top electronics 40 in this example) avoids the need for the system to use an expensive and complicated router. The set-top electronics 40 has a microprocessor 120 and associated memory 122 to identify and route the data packets back to the network 34.

The direct circuit between the network interface unit 32 and the set-top electronics 40 provides a jitter-free connection for video data, but the re-routing of other data into the network 34 through the hub allows more than one type of data to be carried into the home by the network interface unit 32. Once the direct circuit between a network interface unit 32 and a set-top electronics unit 40 is established, collision detection is required by the set-top electronics 40 to allow it to transmit to the hub 42. The set-top electronics 40 needs to learn of collisions and re-transmit the data to the network 34 if such collisions occur. The network interface unit 32 can be set, in certain embodiments, to disable collisions because they cannot occur on the direct circuit. However, in certain embodiments, in both the network interface unit port and the set-top electronics port (to the network 34 through the crossbar 44), the same collision pair is included for convenience.

In certain preferred embodiments, one of the five pairs of wires is available to provide picture-in-picture capability for the system. For example, the network interface unit 32 may provide a second stream of data through another transceiver 88a over a second pair of transmit wires onto a separate crossbar connection line 114. The set-top electronics 40, which has another transceiver 88a also connected to line 114, receives this second stream of data through the direct circuit to provide a picture-in-picture on a television screen. Thus, both pictures may be provided without jitter by separate direct circuits.

In certain preferred embodiments of the present invention, the crossbar switches 108 are implemented by an analog MOS array of transistors, controlled in response to signals from the controller 110. This is exemplary only, however, as other embodiments employ switches of different design, as appreciated by one of ordinary skill in the art.

Although the description of the invention depicts the arrangement with certain logical distinctions of the functionality of various elements, these logical distinctions may be different in other embodiments. For example, the hub 42 is described as connected to the internal network. However, the hub 42 may also be logically considered as part of the internal network, or even forming the network, with the remaining wiring forming means for attaching end terminals to the hub 42. One of ordinary skill in the art, therefore, will appreciate that the logical distinctions depicted and described in the present specification are exemplary only.

The separation of the network interface unit and the set-top electronics according to the present invention provides a relatively inexpensive connection of a multitude of devices to each other within the home, and to the outside world.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multimedia network comprising:

an external network port having a plurality of network interface units, wherein each of the network interface units is configured to provide access to an external network, convert a first signal received from the external network to a corresponding second signal, and output the second signal, and wherein at least one network interface unit further includes a transport device for selecting a single program from a plurality of programs in the first signal and the second signal includes the selected single program;

an internal digital network coupled to the each of the plurality of network interface units and configured to carry each of the second signals output by the plurality of network interface units; and a plurality of set top boxes coupled to the internal digital network, wherein at least one of the set top boxes is configured to receive at least one of the second signals from the internal digital network, and provide a corresponding third signal to at least one end terminal, and wherein one of the set top boxes receives the one second signal and provides information corresponding to the selected single program to the end terminal via the third signal.

2. The network of claim 1, wherein at least one of the plurality of set top boxes further includes a controller coupled to the internal digital network and configured to control two-way digital communication between the set top box and the internal digital network.

3. The network of claim 1, further including a plurality of processing devices coupled to the internal digital network and configured to exchange processing signals over the internal digital network.

4. The network of claim 3, further including a plurality of peripheral devices coupled to the internal digital network and configured to respond to at least a portion of the processing signals exchanged over the internal network.

5. The network of claim 3, further comprising a home automation network coupled between one of the processing devices and at least one appliance, wherein the processing device is configured to control the appliance in response to at least one signal selected from the group of a second signal and a processing signal as received over the internal digital network.

6. The network of claim 1, wherein the internal digital network is an Ethernet network.

7. The network of claim 6, wherein the Ethernet network is 10 baseT Ethernet.

8. The network of claim 6, wherein the Ethernet network is 100 baseT Ethernet.

9. The network of claim 1, wherein the internal network further includes a hub coupled to the external network port and configurable to provide an interconnection between at least one network interface unit and one set top electronics unit.

10. The network of claim 1, further comprising a local peripheral network coupled between one of the set top boxes and at least one peripheral device, wherein the set top box is further configured to provide an interface between the internal digital network and the local peripheral network.

* * * * *